United States Patent
Ishii et al.

(10) Patent No.: US 12,497,307 B2
(45) Date of Patent: Dec. 16, 2025

(54) METHOD FOR OPERATING DEMINERALIZATION APPARATUS

(71) Applicant: KURITA WATER INDUSTRIES LTD., Tokyo (JP)

(72) Inventors: Kazuki Ishii, Tokyo (JP); Kunihiro Hayakawa, Tokyo (JP); Junichi Takahashi, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 529 days.

(21) Appl. No.: 18/013,901

(22) PCT Filed: Sep. 2, 2021

(86) PCT No.: PCT/JP2021/032304
§ 371 (c)(1),
(2) Date: Dec. 30, 2022

(87) PCT Pub. No.: WO2022/054689
PCT Pub. Date: Mar. 17, 2022

(65) Prior Publication Data
US 2024/0067539 A1   Feb. 29, 2024

(30) Foreign Application Priority Data
Sep. 14, 2020   (JP) ................. 2020-153862

(51) Int. Cl.
*C02F 1/44* (2023.01)
(52) U.S. Cl.
CPC .......... *C02F 1/441* (2013.01); *C02F 2303/22* (2013.01)

(58) Field of Classification Search
CPC .............. B01D 2321/02; B01D 2311/12; B01D 65/02; B01D 65/06; C02F 2303/22
See application file for complete search history.

(56) References Cited

U.S. PATENT DOCUMENTS 9,039,899 B2   5/2015   McGinnis

FOREIGN PATENT DOCUMENTS

| CN | 105073229 | 4/2017 |
| CN | 106413860 | 11/2019 |

(Continued)

OTHER PUBLICATIONS

Kawakatsu et al—JP 2005-28329 FIT translation—Feb. 3, 2005 (Year: 2005).*

(Continued)

*Primary Examiner* — Bradley R Spies
(74) *Attorney, Agent, or Firm* — JCIPRNET

(57) ABSTRACT

The present invention is a method for operating a demineralization apparatus provided with a plurality of demineralizing lines arranged in parallel and having demineralizers, the method comprising passing through some of the demineralizing lines water to be treated to produce demineralized water while passing through another demineralizing line(s) dilute water from a dilute water tank to perform washing of the line(s), and returning water used for said washing back to the dilute water tank, and being characterized by, when the water quality of the dilute water is on the high salts concentration side past a predefined value, discharging part of the dilute water so as to let said part join the water to be treated and providing a new supply of dilute water for replenishment.

5 Claims, 3 Drawing Sheets

(56) References Cited

FOREIGN PATENT DOCUMENTS

| | | | | |
|---|---|---|---|---|
| JP | 2001187323 | | 7/2001 | |
| JP | 2003181247 | | 7/2003 | |
| JP | 2004141846 | | 5/2004 | |
| JP | 2004261724 | | 9/2004 | |
| JP | 2005028329 | | 2/2005 | |
| JP | 2005046801 | | 2/2005 | |
| JP | 2016185520 | | 10/2016 | |
| KR | 20150005008 A | * | 1/2015 | ............ B01D 61/12 |
| TW | I400120 | | 7/2013 | |

OTHER PUBLICATIONS

Park et al—KR 2015-0005008 A FIT translation—Jan. 14, 2015 (Year: 2015).*
"Office Action of Taiwan Counterpart Application", issued on Dec. 19, 2024, with English translation thereof, p. 1-p. 10.
"International Search Report (Form PCT/ISA/210) of PCT/JP2021/032304," mailed on Nov. 2, 2021, with English translation thereof, pp. 1-4.

* cited by examiner

METHOD FOR OPERATING DEMINERALIZATION APPARATUS

CROSS-REFERENCE TO RELATED APPLICATION

This application is a 371 application of the International PCT application serial no. PCT/JP2021/032304, filed on Sep. 2, 2021, which claims the priority benefit of Japan application JP2020-153862, filed on Sep. 14, 2020. The entirety of each of the above-mentioned patent application is hereby incorporated by reference herein and made a part of this specification.

TECHNICAL FIELD

The present invention relates to a method for operating a demineralization apparatus, and specifically, to a method for operating a demineralization apparatus including a plurality of demineralization lines.

BACKGROUND ART

In demineralization apparatuses such as reverse osmosis membranes, long-term operation causes precipitation of scale such as calcium carbonate, silica, and calcium fluoride and membrane clogging due to organic matter, which results in deterioration of the demineralization apparatus performance such as a decrease in a salt removal rate and a decrease in the amount of permeate water. In the case of scale clogging, in order to prevent demineralization apparatus performance from deteriorating, a method of measuring an ion concentration in raw water and performing an operation so that the saturation index is not exceeded in concentrated water of the demineralization apparatus is used. Here, "saturation index" generally refers to a logarithmic value of the value obtained by dividing the product of the concentration and ionic strength of each ion species involved in scale generation by the solubility product. The demineralization apparatus is operated in a range in which the saturation index does not exceed zero. In addition, when the saturation index is exceeded, for example, the demineralization apparatus is operated after generation of scale is reduced by adding a scale inhibitor.

In cases where water quality greatly exceeds the saturation index, and it cannot be reduced even by adding a scale inhibitor, chemical washing such as acid washing or alkaline washing has been performed in order to remove scale in the related art. However, general washing is a process in which an apparatus is stopped, a washing solution is adjusted and washing is then performed, a washing solution is recovered and then water passing starts, which results in a problem of high washing cost. Therefore, it has been desired to operate a demineralization apparatus in which performance of the demineralization apparatus does not deteriorate even after long-term operation and that does not require chemical washing.

One method for operating a demineralization apparatus is, for example, a flushing method. Here, flushing refers to an operation of discharging water supplied from a concentrated water discharge pipe to the outside of the system. When water is passed at a higher flow rate than during a normal operation, it is possible to effectively wash away contaminants that clog the membrane surface. Flushing is generally performed at a frequency of 1 to 10 times/day for 30 to 120 seconds/time. However, there is a problem that flushing for several minutes/time is not sufficient to recover the performance of a demineralization apparatus whose performance has deteriorated, and washing eventually has to be performed. In addition, when flushing is performed, since the on-off valve on the concentrated water pipe is opened, it is not possible to produce permeate water during flushing, and the recovery rate of the demineralization apparatus decreases.

As another method, there is a method of reversing a flow direction of water to be treated in the module. According to this method, it is possible to easily detach suspended matter accumulated in the raw water spacer, and the stability of the demineralization apparatus is improved. However, there is a problem that the number of valves required for reversing the flow significantly increases, and the initial cost is significantly high. In addition, if the valve fails, the valve cannot be switched, and the stability of the apparatus is greatly impaired. In addition, there is no description of a detachment effect on scale matter due to flow reversal.

CITATION LIST

Patent Literature

[Patent Literature 1]
Japanese Patent Laid-Open No. 2004-141846
[Patent Literature 2]
Japanese Patent Laid-Open No. 2004-261724

SUMMARY OF INVENTION

Technical Problem

The present invention has been made in view of the above problems, and an objective of the present invention is to provide a method for operating a demineralization apparatus including a plurality of demineralization lines in which the demineralization performance of the demineralizing line that has been deteriorated can be recovered without stopping the operation of the demineralization apparatus, and also the amount of dilute water used is small.

Solution to Problem

A method for operating a demineralization apparatus of the present invention is a method for operating a demineralization apparatus in which a plurality of demineralizing lines having a demineralizer are provided parallel, the method including performing washing, while water to be treated is passed through some of the demineralizing lines to produce demineralized water, by passing dilute water from a dilute water tank through another demineralizing line, and returning washing discharge water to the dilute water tank, wherein, when the water quality of the dilute water reaches a higher salt concentration than a predefined value, some of the dilute water is discharged and joins the water to be treated, and new dilute water is replenished.

In one aspect of the present invention, the pH of the dilute water used for washing is 3.2 or less.

In one aspect of the present invention, as the dilute water, demineralized water in the demineralization apparatus or an unsaturated solution in which the saturation index of scale species is less than zero is used.

In one aspect of the present invention, a scale inhibitor is added to dilute water.

In one aspect of the present invention, the demineralization apparatus is a reverse osmosis membrane apparatus.

Advantageous Effects of Invention

In the method for operating a demineralization apparatus of the present invention, water to be treated is passed through some of the demineralizing lines to produce demineralized water, and during this process, dilute water is passed through another demineralizing line, and thus the demineralization performance of the demineralizing line can be recovered.

In the present invention, it is possible to perform washing with dilute water for a long time before a decrease in the flux proceeds. In addition, when scale is dissolved, and the salt concentration increases in the dilute water circulation system, if some of the dilute water is discharged and new dilute water is replenished, it is possible to maintain the dilute water concentration at a low concentration.

DESCRIPTION OF EMBODIMENTS

Hereinafter, embodiments will be described with reference to the drawings. In the embodiment, a reverse osmosis membrane apparatus (RO apparatus) will be exemplified as a demineralization apparatus, but the present invention is not limited thereto. Examples of demineralization apparatuses other than the reverse osmosis membrane apparatus include a nanofiltration membrane apparatus, a forward osmosis membrane apparatus, a membrane distillation apparatus, an electrodialysis apparatus, and an electrodeionization apparatus.

Figure 1:
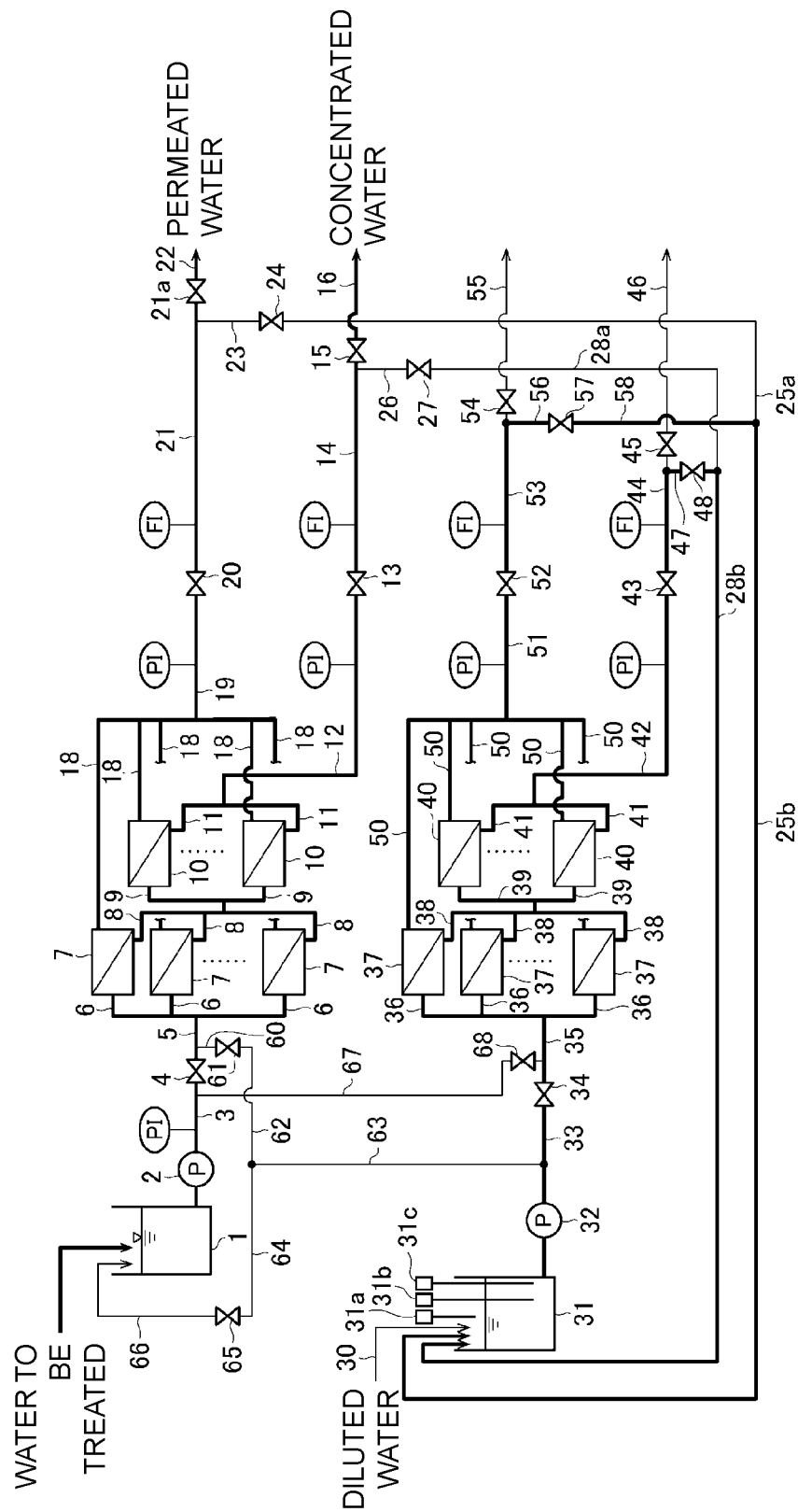
FIG. 1 is a flowchart illustrating a method for operating a demineralization apparatus according to an embodiment.
Figure 2:
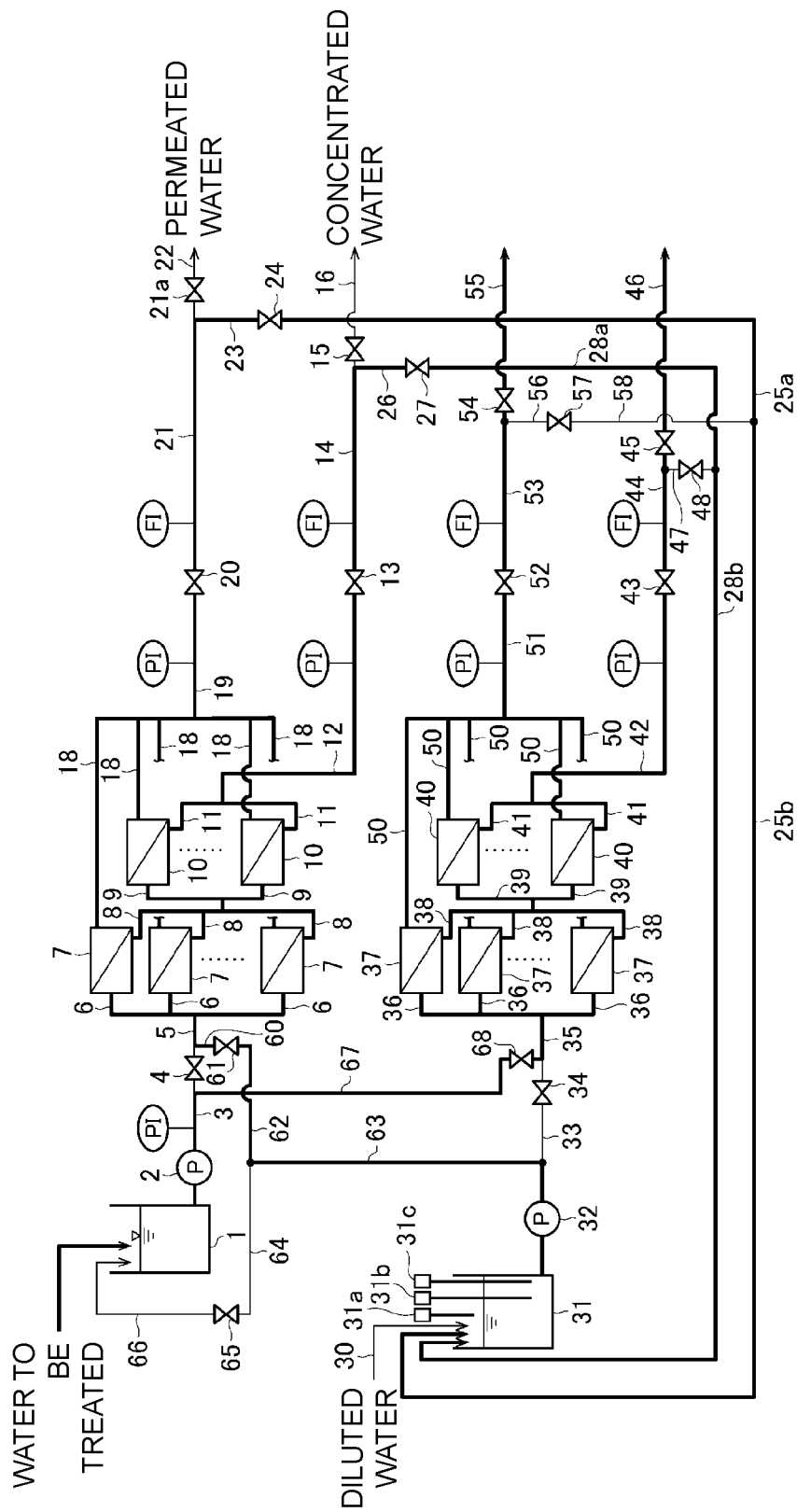
FIG. 2 is a flowchart illustrating a method for operating a demineralization apparatus according to an embodiment.

FIGS. 1 and 2 show the configuration of a demineralization apparatus used in a method for operating a demineralization apparatus according to an embodiment. Here, in FIG. 1, thick solid lines indicate the flow of water in a first water passing pattern, and in FIG. 2, thick solid lines indicate the flow of water in a second water passing pattern. In addition, in the drawings, PI indicates a pressure sensor, and FI indicates a flow rate sensor.

This demineralization apparatus includes a first demineralizing line having first and second RO apparatuses 7 and 10 and a second demineralizing line having third and fourth RO apparatuses 37 and 40. Here, while an RO treatment is performed in one demineralizing line, washing with dilute water is performed in the other demineralizing line.

[First Water Passing Pattern]

In the first water passing pattern, as shown in FIG. 1, raw water is demineralized in the first demineralizing line, and each RO apparatus is washed with dilute water in the second demineralizing line.

<First Demineralizing Line>

In the first demineralizing line with a first water passing pattern, raw water (water to be treated) in a raw water tank 1 is supplied to a concentrated water chamber of a first RO apparatus 7 through a pump 2, a pipe 3, a valve 4, and pipes 5 and 6, and concentrated water from the first RO apparatus 7 is supplied to a concentrated water chamber of each second RO apparatus 10 through pipes 8 and 9. Concentrated water of each second RO apparatus 10 is taken out as concentrated water through pipes 11 and 12, a valve 13, a pipe 14, a valve 15, and a pipe 16.

Permeate water of each of the first RO apparatus 7 and the second RO apparatus 10 is taken out as permeate water through pipes 18 and 19, a valve 20, a pipe 21, a valve 21a, and a pipe 22.

<Second Demineralizing Line>

In the second demineralizing line with a first water passing pattern, dilute water in a dilute water tank 31 is supplied to a concentrated water chamber of the plurality of third RO apparatuses 37 through a pump 32, a pipe 33, a valve 34, and pipes 35 and 36, and water discharged from the concentrated water chamber is supplied to a concentrated water chamber of the fourth RO apparatus 40 through pipes 38 and 39. The water that has passed through the concentrated water chamber of each fourth RO apparatus 40 is returned to the dilute water tank 31 through pipes 41 and 42, a valve 43, pipes 44 and 47, a valve 48, and a pipe 28b.

Permeate water in each of the third RO apparatus 37 and the fourth RO apparatus 40 is returned to the dilute water tank 31 through pipes 50 and 51, a valve 52, pipes 53 and 56, a valve 57, and pipes 58 and 25b.

In the case of the first water passing pattern, in order to make the water flow as described above, the valves 4, 13, 15, 20, and 21a are opened, and valves 61, 24, and 27 are closed. In addition, the valves 34, 43, 48, 52, and 57 are opened, and valves 45, 54, 65, and 68 are closed.

Here, an acid such as hydrochloric acid or sulfuric acid is added from a pH adjusting unit 31a so that the pH of dilute water in the dilute water tank 31 is 3.2 or less or a scale inhibitor is added from a scale inhibitor addition unit 31c, and it is preferable to increase the saturation solubility of hardly soluble components such as calcium fluoride scale.

As the dilute water, raw water that is treated in the RO is suitable, but the present invention is not limited thereto.

[Second Water Passing Pattern]

In the second water passing pattern, as shown in FIG. 2, raw water is demineralized in the second demineralizing line, and each RO apparatus is washed with dilute water in the first demineralizing line.

<First Demineralizing Line>

In the first demineralizing line with a second water passing pattern, dilute water in the dilute water tank 31 is supplied to a concentrated water chamber of the plurality of first RO apparatuses 7 through the pump 32, pipes 63 and 62, a valve 61, and pipes 60, 5, and 6, and the water that has passed through the concentrated water chamber is supplied to a concentrated water chamber of the second RO apparatus 10 through the pipes 8 and 9. The water that has passed through the concentrated water chamber of each second RO apparatus 40 is returned to the dilute water tank 31 through the pipes 11 and 12, the valve 13, pipes 14 and 26, a valve 27, and pipes 28a and 28b.

Permeate water of each of the first RO apparatus 7 and the second RO apparatus 10 is returned to the dilute water tank 31 through the pipes 18 and 19, the valve 20, pipes 21 and 23, the valve 24, and pipes 25a and 25b.

<Second Demineralizing Line>

In the second demineralizing line with a second water passing pattern, raw water (water to be treated) in the raw water tank 1 is supplied to a concentrated water chamber of the third RO apparatus 37 through the pump 2, pipes 3 and 67, the valve 68, and the pipes 35 and 36, and concentrated water from the third RO apparatus 37 is supplied to a concentrated water chamber of each fourth RO apparatus 40 through the pipes 38 and 39. Concentrated water of each fourth RO apparatus 40 is taken out as concentrated water through the pipes 41 and 42, the valve 43, the pipe 44, the valve 45, and a pipe 46.

Permeate water of each of the third RO apparatus 37 and the fourth RO apparatus 40 is taken out as permeate water through the pipes 50 and 51, the valve 52, the pipe 53, the valve 54, and a pipe 55.

In the case of the second water passing pattern, in order to make the water flow as described above, the valves 4, 15, 21a, and 65 are closed, and the valves 13, 20, 24, 27, and 61 are opened. In addition, the valves 34, 48, and 57 are closed, and the valves 43, 45, 52, 54, and 68 are opened.

[Water Passing Pattern When Water Quality of Dilute Water is Secured]

When dilute water is circulated, the water passing pressure is basically not set too high and all of the treated water and concentrated water are returned to the dilute water tank 31 so that the dilute water is not concentrated and circulated while a dilute concentration is maintained.

However, in both FIGS. 1 and 2, since washing discharge water when the RO apparatus is washed with dilute water is returned to the dilute water tank 31, the solute concentration of dilute water in the dilute water tank 31 gradually increases. Here, when the water quality detected value detected in a water quality monitor 31b exceeds a predefined value, the valve 65 is opened, and at least some of dilute water supplied from the pump 32 is discharged to the raw water tank 1 through the pipes 63 and 64, the valve 65, and a pipe 66. An amount of new dilute water corresponding to the amount of discharged water is introduced into the dilute water tank 31 from a replenishment line 30 using a ball tap or the like. As the water quality monitor 31b, an electrical conductivity meter, a colorimetric analyzer, an ion electrode and the like are suitable.

In the method for operating a demineralization apparatus, while an operation of producing permeate water continues in one demineralizing line, when an operation of passing dilute water maintained at a low concentration is performed in the other demineralizing line, the flux of the demineralizing line is recovered and a decrease in the recovery rate can be prevented without stopping the demineralization apparatus. In addition, since the entire amount of dilute water used for washing is returned to the dilute water tank 31, the amount of dilute water consumed is small.

[Switching Timing from Normal Operation to Recovery Operation]

In the present invention, when a normal operation is performed for a predefined time, the operation can be switched to a recovery operation, but it is preferable to perform switching when scale is generated in the second demineralization apparatus. When a case in FIG. 1 in which a reverse osmosis membrane is used as the demineralization apparatus is exemplified, switching is performed when the transmission flux of the second RO apparatus 10 decreases by a set proportion from the initial stage of the operation, for example, decreases by 5%. Here, this 5% is an example, the set proportion may be a value selected from 1 to 20%, and particularly from 1 to 10%. In particular, it is preferable to measure a change in the transmission flux of the most concentrated terminal RO in the second RO apparatus.

Since the actual transmission flux is affected by the operation pressure, the water temperature, and the salt concentration during water supply, it is desirable to determine the corrected transmission flux as data indicating performance of the RO apparatus.

Here, the corrected transmission flux is generally calculated by the method described in standardization methods of reverse osmosis membrane elements and module permeate water amount performance data as shown in JIS K 3805: 1990.

That is, the permeate water amount performance data is corrected by the following Formula (1) to calculate the corrected transmission flux $F_{ps}$.

[Math. 1]

$$F_{ps} = (Q_{pa}) \times \frac{\left[P_{fa} - \frac{\Delta P_{fba}}{2} - P_{pa} - \pi_{fba} + \pi_{pa}\right]}{\left[P_{fs} - \frac{\Delta P_{fbs}}{2} - P_{ps} - \pi_{fbs} + \pi_{ps}\right]} \times \frac{(TCF_a)}{(TCF_s)} \quad (1)$$

Here, $Q_{pa}$: permeate water amount under actual operation conditions (m³/d)

$P_{fa}$: operation pressure under actual operation conditions (kPa)

$\Delta P_{fba}$: module differential pressure under actual operation conditions (kPa)

$P_{pa}$: pressure on the side of permeate water under actual operation conditions (kPa)

$\mu_{fba}$: osmotic pressure of average solute concentration on supply side and concentration side under actual operation conditions (kPa)

$TCF_a$: temperature conversion factor under actual operation conditions $P_{fs}$: operation pressure under standard operation conditions (kPa)

$\Delta P_{fbs}$: module differential pressure under standard operation conditions (kPa)

$P_{ps}$: pressure on the side of permeate water under standard operation conditions (kPa)

$\mu_{fbs}$: osmotic pressure of average solute concentration on supply side and concentration side under standard operation conditions (kPa)

$TCF_s$: temperature conversion factor under standard operation conditions.

[Water Passing Direction of Dilute Water]

As shown in FIG. 1, dilute water is preferably passed from the water supply side of the second RO apparatus. However when dilute water having good water quality is used, it may be passed from the concentrated water outlet side.

While the RO apparatuses are installed in two stages in the above embodiment, they may be installed in one stage or three or more stages. In addition, while the demineralizing lines are provided in two rows in the above embodiment, they may be provided in three or more rows.

EXAMPLES

<Purpose of Test>

Simulated raw water composed of a fine calcium fluoride particle dispersion liquid was prepared, pure water was alternately passed through a test RO apparatus, and the flux recovery property was measured.

<Test Method>

Figure 3:
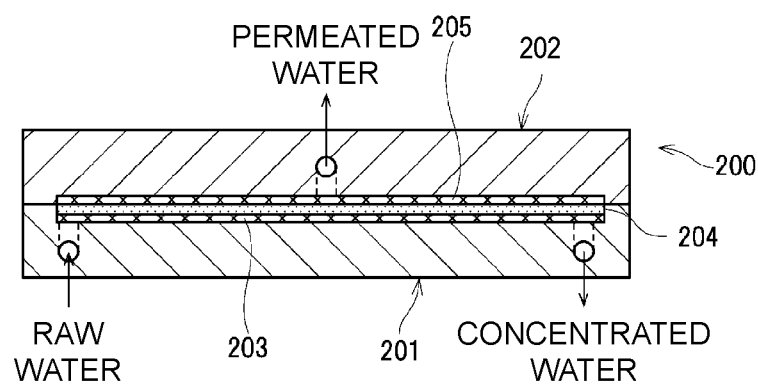
FIG. 3 is a cross-sectional view of a test cell.

In a flat film type RO apparatus 200 in FIG. 3 having a rectangular RO membrane with a membrane surface size of 95 mm×146 mm, the following simulated raw water and simulated dilute water (simulated dilute water with a scale inhibitor added except for Test Example 1) were passed according to the following three steps in order. The RO apparatus 200 includes a lower cell 201, an upper cell 202, a mesh spacer 203 between the cells, an RO membrane 204 and a permeate water side spacer 205.

<Water Passing Order>

First simulated raw water passing step: simulated raw water was passed at an initial flux of 0.45 m/D and a water passing flow rate of 0.1 m/s, and a water passing test was performed with a certain permeate water amount (therefore, the corrected transmission flux gradually decreased over time). The water supply pressure was 25 constant (therefore, the flux gradually decreased over time).

Dilute water passing step: after the corrected transmission flux decreased by 10 to 15% from the initial value, dilute water was passed at a water passing flow rate of 0.1 m/s for 45 minutes.

Second simulated raw water passing step: simulated raw water was passed at the same water supply pressure and permeate water amount as in the first simulated raw water passing step.

<Simulated Raw Water>

Calcium chloride dehydrate and sodium hydrogen carbonate were dissolved in pure water at a Ca concentration of 650 mg/L and a F concentration of 70 mg/L to prepare simulated raw water.

pH: 5.5
water temperature: 22 to 23° C.

<Simulated Dilute Water>

Simulated dilute water prepared in the same manner as the above simulated raw water so that the Ca and Na concentrations and pH were as shown in Table 1 was used.

<Simulated Dilute Water with Scale Inhibitor Added>

A sample obtained by adding 2-phosphonobutane-1,2,4-tricarboxylic acid as a scale inhibitor to the above simulated dilute water so that the concentrations were as shown in Table 1 was used.

[Results]

The ratio $F/F_0$ of the corrected transmission flux F immediately before the first simulated raw water passing step was completed and the initial corrected transmission flux $F_0$ is shown as "flux ratio before dilute water passing" in Table 1.

The ratio $F'/F_0$ of the corrected transmission flux F' immediately after the second simulated raw water passing step started and the initial corrected transmission flux $F_0$ is shown as "flux ratio after dilute water passing" in Table 1.

The value of [flux ratio after dilute water passing]/[flux ratio before dilute water passing] is shown as a "recovery ratio" in Table 1.

TABLE 1

| | Water quality of dilute water | | | | (1) Flux ratio before dilute water passing | (2) Flux ratio after dilute water passing | Recovery ratio ((2) ÷ (1)) |
|---|---|---|---|---|---|---|---|
| | Ca mg/L | F mg/L | pH value | scale inhibitor mg/L | | | |
| Test Example 1 | <0.1 | <0.1 | 5.5 | 0 | 94.80% | 99.80% | 1.05 |
| Test Example 2 | <0.1 | <0.1 | 5.5 | 10 | 95.20% | 99.80% | 1.05 |
| Test Example 3 | 3.2 | 0.8 | 5.5 | 10 | 95.60% | 98.80% | 1.03 |
| Test Example 4 | 32 | 8 | 3.2 | 10 | 94.80% | 99.80% | 1.05 |
| Test Example 5 | 25 | 16 | 3 | 10 | 93.30% | 94.20% | 1.01 |
| Test Example 6 | 32 | 8 | 5.5 | 500 | 94.50% | 96.40% | 1.02 |
| Test Example 7 | 32 | 8 | 5.5 | 50 | 94.50% | 95.80% | 1.01 |
| Test Example 8 | 32 | 8 | 5.5 | 10 | 94.30% | 94.50% | 1 |
| Test Example 9 | 32 | 8 | 3.5 | 10 | 96.00% | 95.30% | 0.99 |
| Test Example 10 | 64 | 40 | 3 | 10 | 95.80% | 95.50% | 1 |
| Test Example 11 | 32 | 20 | 3 | 10 | 93.40% | 93.80% | 1 |

[Conclusions]
(1) As shown in Table 1, the dilute water passing step was performed and thus the flux was recovered (increased).
(2) Comparing Test Examples 2, 3, and 8, it was confirmed that a higher recovery rate was obtained as the water quality of dilute water was diluted.
(3) As shown in Test Example 1, in the case of dilute water which was sufficiently diluted, a high recovery ratio was obtained even if no scale inhibitor was added.
(4) As shown in Test Examples 6, 7, and 8, if the dilute water had poor water quality, it was difficult to obtain a high recovery ratio even if a scale inhibitor was added.
(5) As shown in Test Examples 4, 7, and 8, even if the dilute water had poor water quality, a higher recovery ratio was obtained if the pH of the dilute water was 3.2 or less.
(6) As shown in Test Examples 5, 10, and 11, if the F concentration in the dilute water was excessively high ($\geq 20$ mg/L), a high recovery ratio was not obtained even at a low pH.

In condition (i) in which the water quality of dilute water is diluted, condition (ii) in which the pH of dilute water is 3.2 or less, and condition (iii) in which a scale inhibitor is added, a stronger Flux improvement effect is obtained when the conditions (i) and (ii) or (iii) are satisfied than when the condition (i) alone is satisfied. In addition, when the pH of the dilute water is lowered, it is possible to maintain a Flux improvement effect even with dilute water with poor water quality.

While the present invention has been described in detail with reference to specific embodiments, it will be apparent to those skilled in the art that various modifications can be made without departing from the spirit and scope of the present invention.

Priority is claimed on Japanese Patent Application No. 2020-153862, filed Sep. 14, 2020, the content of which is incorporated herein by reference.

REFERENCE SIGNS LIST

1 Raw water tank
7, 10, 37, 40 RO apparatus
31 Dilute water tank.

The invention claimed is:

1. A method for operating a demineralization apparatus in which a plurality of demineralizing lines having a demineralizer are provided parallel, the method comprising:
performing washing, while water to be treated is passed through some of the demineralizing lines to produce demineralized water, by passing dilute water from a dilute water tank through another demineralizing line, and returning washing discharge water to the dilute water tank,
wherein, when the water quality of the dilute water reaches a higher salt concentration than a predefined value, some of the dilute water is discharged and joins the water to be treated, and new dilute water is replenished.

2. The method for operating a demineralization apparatus according to claim 1,
wherein the pH of the dilute water used for washing is 3.2 or less.

3. The method for operating a demineralization apparatus according to claim 1,
wherein, as the dilute water, demineralized water in the demineralization apparatus or an unsaturated solution in which the saturation index of scale species is less than zero is used.

4. The method for operating a demineralization apparatus according to claim 1,
wherein a scale inhibitor is added to dilute water.

5. The method for operating a demineralization apparatus according to claim 1,
wherein the demineralization apparatus is a reverse osmosis membrane apparatus.

* * * * *